(12) United States Patent
Kaufmann

(10) Patent No.: US 8,548,667 B2
(45) Date of Patent: Oct. 1, 2013

(54) HANDS ON STEERING WHEEL DETECT IN LANE CENTERING OPERATION

(71) Applicant: Timothy W. Kaufmann, Frankenmuth, MI (US)

(72) Inventor: Timothy W. Kaufmann, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/688,717

(22) Filed: Nov. 29, 2012

(65) Prior Publication Data

US 2013/0158771 A1    Jun. 20, 2013

Related U.S. Application Data

(60) Provisional application No. 61/576,020, filed on Dec. 15, 2011.

(51) Int. Cl.
   *G01C 22/00* (2006.01)
(52) U.S. Cl.
   USPC .......................................................... 701/23
(58) Field of Classification Search
   None
   See application file for complete search history.

(56) References Cited

U.S. PATENT DOCUMENTS

| 4,962,570 A | * | 10/1990 | Hosaka et al. ................. 123/399 |
| 4,976,239 A | * | 12/1990 | Hosaka .......................... 123/399 |
| 5,668,721 A | | 9/1997 | Chandy |
| 2008/0009986 A1 | * | 1/2008 | Lu et al. .......................... 701/29 |

FOREIGN PATENT DOCUMENTS

| DE | 102005056438 A1 | 6/2007 |
| DE | 102010025197 A1 | 12/2011 |
| EP | 2384946 A2 | 11/2011 |

OTHER PUBLICATIONS

European Search Report mailed Mar. 6, 2013 for European Application No. 12196665.9-1752.

* cited by examiner

*Primary Examiner* — Thomas Tarcza
*Assistant Examiner* — Adam Alharbi
(74) *Attorney, Agent, or Firm* — Cantor Colburn LLP

(57) ABSTRACT

A control system to determine a hands on wheel (HOW) condition is provided. The control system includes a sensor that monitors an amount of applied torque exerted upon a hand wheel, and a control module for monitoring the sensor. The control module includes a notch filter to attenuate a normal column mode frequency from the amount of applied torque to produce a filtered torque signal. The normal column mode frequency represents a range of vibrational modes of the hand wheel based on a hands off wheel condition. The control module includes a state detector to receive the filtered torque signal from the notch filter. The state detector determines if the HOW condition exists based on if the filtered torque signal exceeds an ON threshold torque value.

20 Claims, 9 Drawing Sheets

US 8,548,667 B2

HANDS ON STEERING WHEEL DETECT IN LANE CENTERING OPERATION

CROSS-REFERENCES TO RELATED APPLICATIONS

This patent application claims priority to U.S. Provisional Patent Application Ser. No. 61/576,020 filed Dec. 15, 2011 which is hereby incorporated herein by reference in its entirety.

BACKGROUND OF THE INVENTION

The current approach to detect if a driver has his or her hands placed on a steering wheel or hand wheel utilizes hardware. Specifically, the hardware may be one or more sensors that are placed on the hand wheel to detect if the driver's hands are positioned on the hand wheel. The signals generated by the sensors are routed to a controller and processed to make a final determination if the driver's hands are positioned on the hand wheel. For example, in one approach, capacitive touch technology may be used to detect if the driver's hands are positioned on the steering wheel. Providing additional sensors to detect if the driver's hands are positioned on the hand wheel adds cost and complexity to a steering system.

SUMMARY

In one embodiment, a control system to determine a hands on wheel (HOW) condition is provided. The control system includes a sensor that monitors an amount of applied torque exerted upon a hand wheel, and a control module for monitoring the sensor. The control module includes a notch filter to attenuate a normal column mode frequency from the amount of applied torque to produce a filtered torque signal. The normal column mode frequency represents a range of vibrational modes of the hand wheel based on a hands off wheel condition. The control module includes a state detector to receive the filtered torque signal from the notch filter. The state detector determines if the HOW condition exists based on if the filtered torque signal exceeds an ON threshold torque value.

In another embodiment, a method of determining a HOW condition of a hand wheel is provided. The method includes monitoring a sensor for an amount of applied torque exerted upon the hand wheel by a control module. The method includes attenuating a normal column mode frequency from the amount of applied torque to produce a filtered torque signal by a notch filter of the control module. The normal column mode frequency represents a range of vibrational modes of the hand wheel based on a hands off wheel condition. The method includes receiving the filtered torque signal by a state detector of the control module. The method includes determining if the HOW condition exists by the state detector, the determining based on comparing the filtered torque signal with an ON threshold torque value.

In yet another embodiment, a control system to determine a HOW condition of a hand wheel is provided. The control system includes a sensor that monitors an amount of applied torque exerted upon the hand wheel, and a control module for monitoring the sensor. The control module includes a bandpass filter module to receive the amount of applied torque and produce at least two passbands based on the amount of applied torque. The at least two passbands fall within the normal column mode frequency. The normal column mode frequency represents a range of vibrational modes of the hand wheel based on a hands off wheel condition. The control module includes a dominant band block that determines a dominant frequency based on the at least two passbands. The control module includes a HOW detector module to compare the dominant frequency to a representative frequency to determine if the HOW condition exists. The representative frequency is a range of frequencies of the hand wheel if the HOW condition exists.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
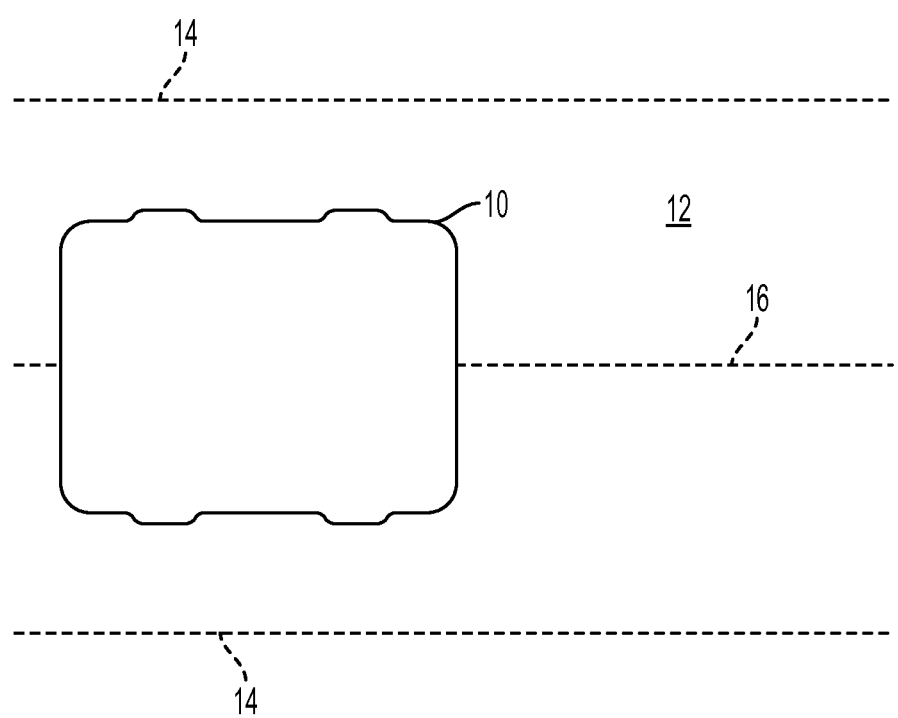
FIG. 1 is a schematic diagram of a vehicle in accordance with an exemplary embodiment of the invention.

Referring now to the Figures, where the invention will be described with reference to specific embodiments, without limiting same, FIG. 1 is an exemplary schematic illustration of a vehicle 10 driving within a lane 12. The lane 12 includes lane markers 14 on the left and right hand sides on the lane 12 and a lane center 16 (the lane center 16 is a calculated value, as there is no lane marker for the lane center 16). The vehicle 10 includes a lane monitoring system 32 (shown in FIG. 2) to assist the vehicle 10 in maintaining a position within the lane 12 that is generally aligned with the lane center 16.

Figure 2:
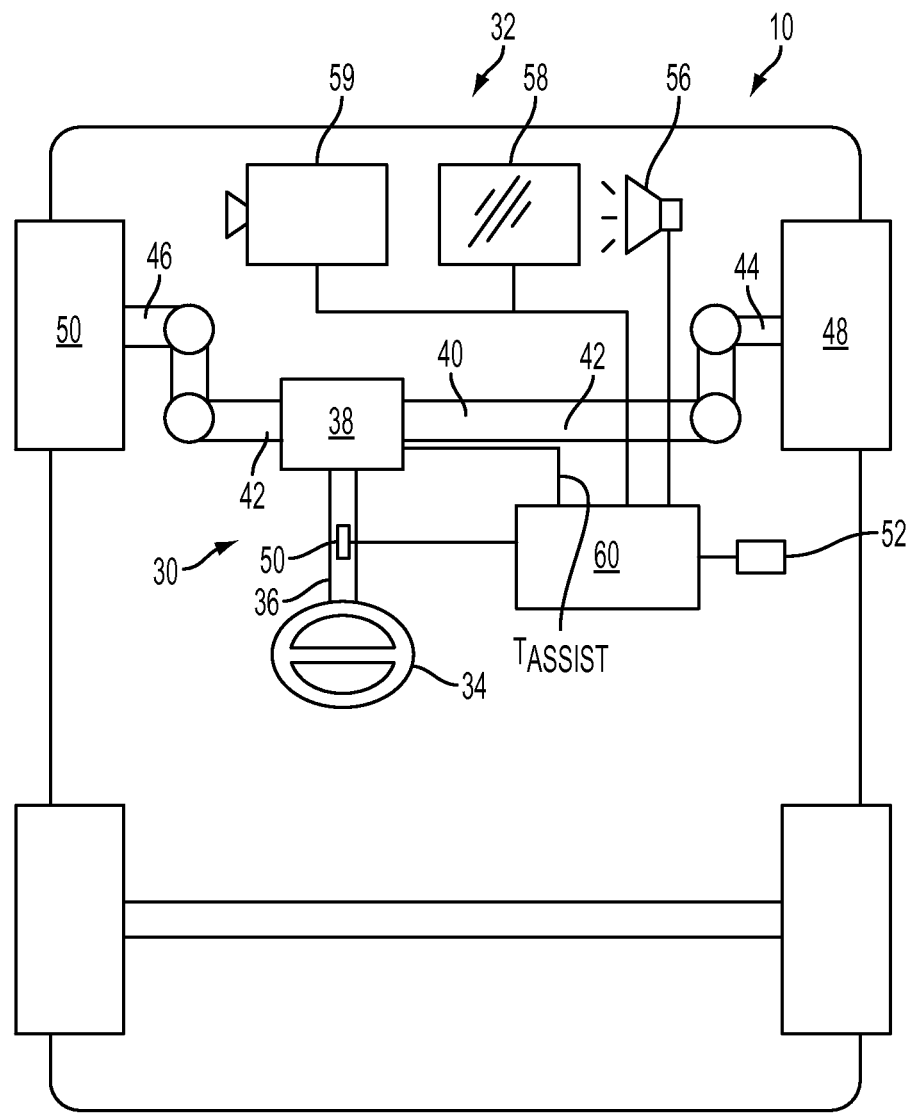
FIG. 2 is a schematic diagram of a steering system for the vehicle shown in FIG. 1, in accordance with another exemplary embodiment of the invention.

FIG. 2 is an exemplary schematic diagram of the vehicle 10 that includes a steering system 30 and the lane monitoring system 32. The steering system 30 includes a hand wheel 34 coupled to a steering shaft 36. In one exemplary embodiment, the steering system 30 may be an electric power steering (EPS) system that further includes a steering assist unit 38 that couples to the steering shaft 36 of the steering system 30, a rack and pinion steering mechanism 39, to tie rods 40, 42 of the vehicle 10. The steering assist unit 38 includes, for example, the rack and pinion steering mechanism 39 that may be coupled through the steering shaft 36 to a steering actuator motor and gearing. During operation, as the handwheel 34 is turned by a vehicle operator, the motor of the steering assist unit 38 provides the assistance to move the tie rods 40, 42 which in turn moves steering knuckles 44, 46, respectively, coupled to roadway wheels 48, 50, respectively of the vehicle 10.

As shown in FIG. 2, the vehicle 10 further includes various sensors that detect and measure observable conditions of the steering system 30 and/or of the vehicle 10. In one example, a torque sensor 50 and a vehicle speed sensor 52 are provided. The torque sensor 50 monitors an amount of torque that is exerted upon the hand wheel 34, and transmits a signal indicative of the amount of torque. The torque sensor 50 may be a compliant type sensor that includes a compliant member such, for example, a compliant torsion bar, t-bar, or spring. Although a compliant type torque sensor 50 is discussed, it is to be understood that a non-compliant type torque sensor (e.g., a sensor that does not include a compliant member) may be used as well.

A steering control module 60 controls the operation of the steering system 30, the lane monitoring system 32, and the steering assist unit 38 based on one or more of the signals from the sensors 50 and 52. In various embodiments, the steering control module 60 can include one or more sub-modules and datastores. As used herein the terms module and sub-module refer to an application specific integrated circuit (ASIC), an electronic circuit, a processor (shared, dedicated, or group) and memory that executes one or more software or firmware programs, or a combinational logic circuit that provide the described functionality.

The lane monitoring system 32 includes a camera 59 for monitoring the lane 12 (FIG. 1), a speaker 56, and a display 58. Referring now to both FIGS. 1-2, the camera 59 may capture digital images of the lane 12. The camera 59 includes image processing logic for processing the digital images of the lane 12 to extract or determine various features of interest (e.g., the distances between the lane markers 14 on the left and right hand sides of the lane 12), which is then sent to the steering control module 60. The lane monitoring system 32 generates feedback for a corrective input into the handwheel 34 in the event a path deviation with respect to the lane markers 14 (shown in FIG. 1) is detected by the camera 59. Specifically, the lane monitoring system 32 includes a helper or assist mode and autonomous mode to aid a driver in maneuvering the vehicle 10. In assist mode, if the operator has his or her hands placed upon the hand wheel 34, then the lane monitoring system 32 may provide a warning that the vehicle 10 is approaching a lane marker 10. The warnings may include, for example, an audio warning emitted through the speaker 56, a visual warning that is shown on the display 58, and haptic feedback (e.g., vibration in a driver seat). The lane monitoring system 32 may also apply torque nudges to the hand wheel 34 as a warning. The control module 60 may determine a torque assist command $T_{assist}$ that creates the torque nudges in the hand wheel 34.

Application of the torque assist command $T_{assist}$ upon the hand wheel 34 may cause the vehicle 10 to move or sway back and forth between the lane markers 14 if a driver does not have his or her hands placed on the hand wheel 34, and is not controlling the vehicle 10. Thus, the control module 60 determines a hands on wheel (HOW) condition of the handwheel 34 before the torque assist command $T_{assist}$ is generated. The HOW condition indicates if a driver has placed his or her hands on the hand wheel 34. In one embodiment, the HOW condition may also indicate the level of force that a driver has exerted upon the hand wheel 34. Thus, the torque assist command $T_{assist}$ may be adjusted based on the level of force a driver exerts on the hand wheel 34, where if a driver exerts a relatively high level of force on the hand wheel 34 then the value of the torque assist command $T_{assist}$ may also increase. Also, as the level of force exerted by a driver increases, the control module 60 may predict with a higher confidence that a driver is gripping the hand wheel 34 based on the amount of force applied to the hand wheel 34.

The lane monitoring system 32 may switch from assist mode to autonomous mode after the vehicle 10 has been driven for a predetermined amount of time within the lane marker 14 and within a predetermined distance from the lane center 16. In autonomous mode, the lane monitoring system 32 maintains the vehicle 10 within the lane 12 without input from a driver. However, in some embodiments the lane monitoring system 32 may need to determine if the HOW condition exists first, before switching from assist mode to autonomous mode.

Figure 3:
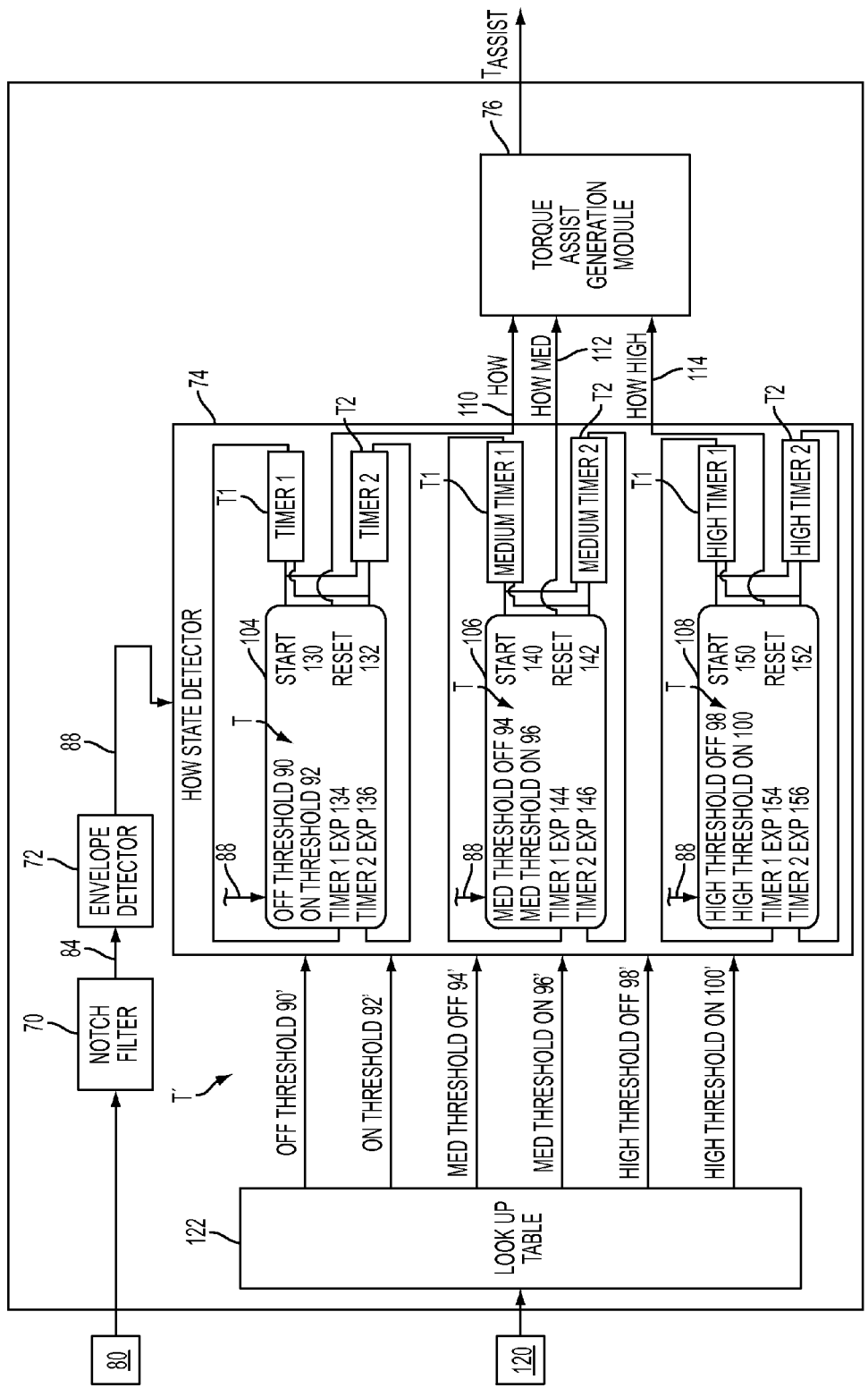
FIG. 3 is an illustration of a dataflow diagram for a control module shown in FIG. 2, in accordance with yet another exemplary embodiment of the invention.

FIG. 3 is a block diagram of the control module 60 illustrating one exemplary approach for determining the HOW condition. In the exemplary embodiment as shown, the control module 60 includes a notch filter 70 (also referred to as a band-stop filter), an envelope detector 72, a HOW state detector 74, and a torque assist generation module 76.

The control module 60 receives as input a torque signal 80 from the torque sensor 50 (FIG. 2) indicative of the amount of torque exerted on the hand wheel 34 (FIG. 2). The torque signal 80 is a time domain based signal having a sequence of data points measured at successive time intervals. The notch filter 70 receives as input the torque signal 80. The notch filter 70 is generally any type of filtering device configured to remove or attenuate a band or range of frequencies in the time domain based torque signal 80 that represent a normal column mode frequency, and produces as output a filtered torque signal 84. The normal column mode frequency represents the vibrational modes that the hand wheel 34 and the steering shaft 36 (FIG. 2) operate at if a driver has not placed his or her hands on the hand wheel 34 (e.g., a hands off wheel condition). As will be further described herein, the invention contemplates that the hands off wheel condition exists if the HOW condition is not detected. For example, in one embodiment, the normal column mode frequency may range from about 8 Hertz to about 15 Hertz. The normal column mode may be adjusted based on the type of torque sensor 50 (FIG. 2) that is provided (e.g., a compliant torque sensor versus a non-compliant torque sensor). The filtered torque signal 84 is then sent to the envelope detector 72.

Figure 4:
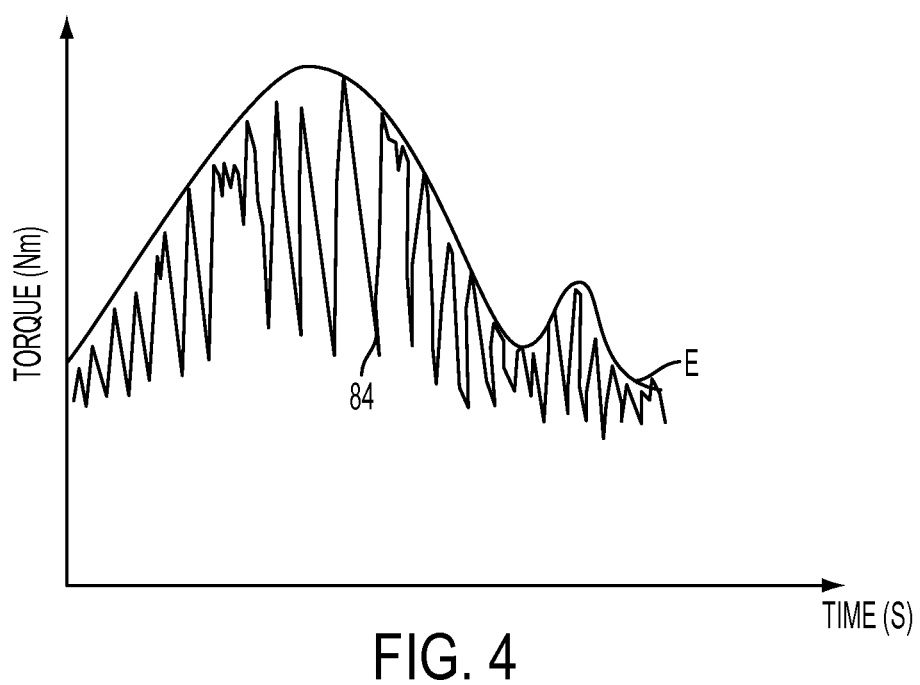
FIG. 4 is an illustration of an output of an envelope detector shown in FIG. 3, in accordance with another exemplary embodiment of the invention.

Referring to both FIGS. 3 and 4, the envelope detector 72 determines an envelope E of the filtered torque signal 84, and produces a HOW detection signal 88 as output. The HOW detection signal 88 represents the envelope E of the filtered torque signal 84 at a given point in time. The envelope detector 72 may use any number of envelope detection approaches to determine the HOW detection signal 88. For example, in software-based approach the envelope detector 72 passes the filtered torque signal 84 to a low pass filter (not illustrated), and then determines an absolute value of the filtered torque signal 84. The HOW detection signal 88 is then sent to the HOW state detector 74.

Referring to FIG. 3, the HOW state detector 74 monitors the HOW detection signal 88 and determines if the HOW condition exists based on comparing the value of the HOW detection signal 88 with a threshold torque value over a predetermined time interval. If the HOW condition is determined to exist, then a HOW signal 110 is generated by the HOW state detector 74 and sent to the torque assist generation module 76. In one embodiment, the HOW state detector 76 may determine the level of force a driver may have on the hand wheel 34 (FIG. 2). For example, a HOW medium signal 112 indicates a relatively moderate level of force, and a HOW high signal 114 indicates a relatively high level of force. If the state detector 74 does not send either the HOW signal 110, the HOW medium signal 112, or the HOW high signal 114 to the torque assist generation module 76, then the hands off wheel condition exists. In the exemplary embodiment as shown in FIG. 3, the HOW state detector 74 includes an ON/OFF sub-module 104, a medium sub-module 106, and a high sub-module 108. The ON/OFF sub-module 104 is used to generate the HOW signal 110, the medium sub-module 106 is used to determine the HOW medium signal 112, and the high sub-module 108 is used to generate the HOW high signal 114. As the level of force exerted by a driver increases (e.g., a relatively moderate level of force indicated by the HOW medium signal 112, or a relatively high level of force indicated by the HOW high signal 114), the control module 60 may predict with a higher confidence level that the HOW condition actually exists. For example, the HOW medium signal 112 indicates the HOW condition exists with relatively more certainty or confidence when compared to the HOW signal 110.

In the exemplary embodiment as shown in FIG. 3, six threshold torque values T are used by the HOW state detector 74, however it is to be understood that any other number of threshold torque values T may be used as well. The ON/OFF sub-module 104 includes an OFF threshold value 90 and an ON threshold value 92. The OFF threshold value 90 indicates a driver does not have his or her hands on the hand wheel 34, and the ON threshold value 92 indicates a driver has his or her hands on the hand wheel 34 (FIG. 2). The medium sub-module 106 includes a Medium Threshold OFF value 94 and a Medium Threshold ON value 96. The Medium Threshold OFF value 94 and the Medium Threshold ON value 96 are indicative of a moderate level of force by a driver on the hand wheel 34 (FIG. 2). The high sub-module 108 includes a High Threshold OFF value 98 and a High Threshold ON value 100. The High Threshold OFF value 98 and the High Threshold ON value 100 are indicative of a high level of force by a driver on the hand wheel 34 (FIG. 2). In one exemplary embodiment, the OFF threshold value 90 is about 0.175 Nm, the ON threshold value 92 is about 0.7 Nm, the Medium Threshold OFF value 94 is about 0.8 Nm, the Medium Threshold ON value 96 is about 1.0 Nm, the High Threshold OFF value 98 is about 1.1 Nm, and the High Threshold ON value 100 is about 1.5 Nm, however it is to be understood that other torque values may be used as well.

In one embodiment, the threshold torque values T may be adjusted based on the speed of the vehicle 10 (FIG. 1). The speed of the vehicle 10 is monitored by the vehicle speed sensor 52 (FIG. 2). The control module 60 receives as input a vehicle speed signal 120 from the vehicle speed sensor 52 (FIG. 2). The vehicle speed signal 120 is sent to a lookup table 122. The lookup table 122 is used to determine modified torque threshold values T' based on the vehicle speed signal 120. The modified torque threshold values T' are then sent to the HOW state detector 74. Specifically, the modified torque threshold values T' include an OFF threshold value 90', an ON threshold value 92', a Medium Threshold OFF value 94', a Medium Threshold ON value 96', a High Threshold OFF value 98', and a High Threshold ON value 100'. The modified torque threshold values T' may be used in place of the torque threshold values T by the state detector 74.

A first timer T1 and a second timer T2 are provided for each of the ON/OFF sub-module 104, the medium sub-module 106, and the high sub-module 108. Specifically, the ON/OFF sub-module 104 is in communication with a first timer T1 and a second timer T2, the medium sub-module 106 is in communication with a medium first timer T1 and a medium second timer T2, and the high sub-module 108 is in communication with a high first timer T1 and a high second timer T2.

The ON/OFF sub-module 104 of the HOW state detector 74 monitors the HOW detection signal 88 until the ON/OFF sub-module 104 determines that the HOW detection signal 88 is greater than the ON threshold value 92. Upon determining the HOW detection signal 88 exceeds the ON threshold value 92, the ON/OFF sub-module 104 sends a start timer signal 130 to both the first timer T1 and the second timer T2. The first timer T1 is configured to count up from a first interval of time when receiving of the start timer signal 130, and the second timer T2 is configured to count up from a second interval of time when receiving of the start timer signal 130. The first interval of time and the second interval of time are calibratable values that maybe adjusted based on the type of application. In one embodiment, the first interval of time of the first timer T1 is less than the second interval of time of the second timer T2. The ON/OFF sub-module 104 continues to monitor the HOW detection signal 88 as the first timer T1 counts up from the first interval of time. It should be noted that the first timer T1 and the second timer T2, the medium first timer T1, the medium second timer T2, the high first timer T1 and the high second timer T2 each run concurrently with one another.

The first timer T1 sends a Timer 1 expired signal 134 to the ON/OFF sub-module 104 once the first interval of time has expired. Once the Timer 1 expired signal 134 is received by the ON/OFF sub-module 104, then the ON/OFF sub-module 104 determines if the HOW detection signal 88 has remained above the ON threshold value 92 during the first interval of time. If the HOW detection signal 88 has remained above the ON threshold value 92 during the first interval of time, then the HOW condition exists. The state detector 74 is set to a HOW=1 state (e.g., a HOW On state exists), and the ON/OFF sub-module 104 generates the HOW signal 110. The ON/OFF sub-module 104 may also send a reset signal 132 to the first timer T1 and the second timer T2. The reset signal 132 initializes the first timer T1 back to time=0. The reset signal 132 causes the second timer T2 to cease counting up, and initializes the second timer T2 back to time=0.

If the HOW detection signal 88 does not remain above the ON threshold value 92 during the first interval of time and the reset signal 132 is not sent, the second timer T2 may continue to count up until the second interval of time has lapsed, and a Timer 2 expired signal 136 is then sent to the ON/OFF sub-module 104. Once the Timer 2 expired signal 136 is received by the ON/OFF module 104, then the ON/OFF sub-module 104 determines if the HOW detection signal 88 has remained below the OFF threshold value 90 during the second interval of time. If the HOW detection signal 88 has remained below the OFF threshold value 90 during the second interval of time, then the HOW condition does not exist. The ON/OFF sub-module 104 may then send the reset signal 132 to initialize the first timer T1 and the second timer T2.

A similar approach may be used to generate the HOW medium signal 112 by the medium sub-module 106. The medium sub-module 106 may monitor the HOW detection signal 88. Upon determining the HOW detection signal 88 is greater than the Medium threshold ON value 96, the medium sub-module 106 sends a start timer signal 140 to both the medium first timer T1 and the medium second timer T2. The medium sub-module 106 continues to monitor the HOW detection signal 88 as the first timer T1 counts up from the first interval of time.

The medium first timer T1 sends a Timer 1 expired signal 144 to the medium sub-module 106 once the first interval of time has expired. Once the Timer 1 expired signal 144 is received by the medium sub-module 106, then the medium sub-module 106 determines if the HOW detection signal 88 has remained above the Medium threshold ON value 96 during the first interval of time. If the HOW detection signal 88 has remained above the Medium threshold ON value 96 during the first interval of time, then the HOW condition exists. The state detector 74 is set to a HOW Medium state and generates the HOW Medium signal 112. The medium sub-module 106 may also send a reset signal 142 to the medium first timer T1 and the medium second timer T2.

If the HOW detection signal 88 does not remain above the Medium threshold ON value 96 during the first interval of time and the reset signal 142 is not sent, the medium second timer T2 may continue to count up until the second interval of time has lapsed, and a Timer 2 expired signal 146 is then sent to the medium sub-module 106. Once the Timer 2 expired signal 146 is received by the medium sub-module 106, then the medium sub-module 106 determines if the HOW detection signal 88 has remained below the Medium threshold OFF value 96 during the second interval of time. If the HOW detection signal 88 has remained below the Medium threshold OFF value 94 during the second interval of time, then the HOW Medium condition does not exist. The medium sub-module 106 may then send the reset signal 142 to initialize the medium first timer T1 and the medium second timer T2.

A similar approach may be used to generate the HOW high signal 114 by the high sub-module 108. The high module 108 monitors the HOW detection signal 88, and upon determining the HOW detection signal 88 is greater than the High threshold ON value 100, the high sub-module 108 sends a start timer signal 150 to both the high first timer T1 and the high second timer T2. The high sub-module 108 continues to monitor the HOW detection signal 88 as the high first timer T1 counts up from the first interval of time.

The high first timer T1 sends a Timer 1 expired signal 154 to the high sub-module 106 once the first interval of time has expired. Once the Timer 1 expired signal 154 is received by the high sub-module 108, then the high sub-module 108 determines if the HOW detection signal 88 has remained above the High threshold ON value 100 during the first interval of time. If the HOW detection signal 88 has remained above the High threshold ON value 100 during the first interval of time, then the HOW High condition exists. The state detector 74 is set to a HOW High state and generates the HOW High signal 114. The high sub-module 108 may also send a reset signal 152 to the high first timer T1 and the high second timer T2.

If the HOW detection signal 88 does not remain above the High threshold ON value 100 during the first interval of time and the reset signal 152 is not sent, the second timer T2 may continue to count up until the second interval of time has lapsed, and a Timer 2 expired signal 156 is then sent to the high sub-module 108. Once the Timer 2 expired signal 156 is received by the high sub-module 108, then the high sub-module 108 determines if the HOW detection signal 88 has remained below the High threshold OFF value 98 during the second interval of time. If the HOW detection signal 88 has remained below the High threshold OFF value 98 during the second interval of time, then the HOW condition does not exist, and the state detector 74 is not set to the HOW High state. The high sub-module 108 may then send the reset signal 152 to initialize the high first timer T1 and the high second timer T2.

The torque assist generation module 76 receives as input the HOW signal 110, the HOW Medium signal 112, or the HOW high signal 114 from the HOW state detector 74. The torque assist generation module 76 selectively generates the torque assist command $T_{assist}$ to create torque nudges in the hand wheel 34 while the lane monitoring system 32 (FIG. 2) is in assist mode. Specifically, the torque assist generation module 76 may only generate the torque assist command $T_{assist}$ in assist mode if one of the HOW signal 110, the HOW Medium signal 112, or the HOW high signal 114 is received from the HOW state detector 74. The torque assist generation module 76 may adjust the value of the torque assist command $T_{assist}$ based on if the HOW signal 110, the HOW Medium signal 112, or the HOW high signal 114 is received. Specifically, the torque assist command $T_{assist}$ increases as the level of force exerted on the hand wheel 34 increases. For example, if the HOW high signal 114 is received, then torque assist command $T_{assist}$ generated may be greater than if the HOW signal 110 was received. The HOW signal 110, the HOW Medium signal 112, or the HOW high signal 114 from the HOW state detector 74 may also be provided to the lane monitoring system 32, where the lane monitoring system 32 may not switch from the assist mode to the autonomous mode unless the HOW condition exists (e.g., either the HOW signal 110, the HOW Medium signal 112, or the HOW high signal 114 is sent by the state detector 74).

Figure 5:
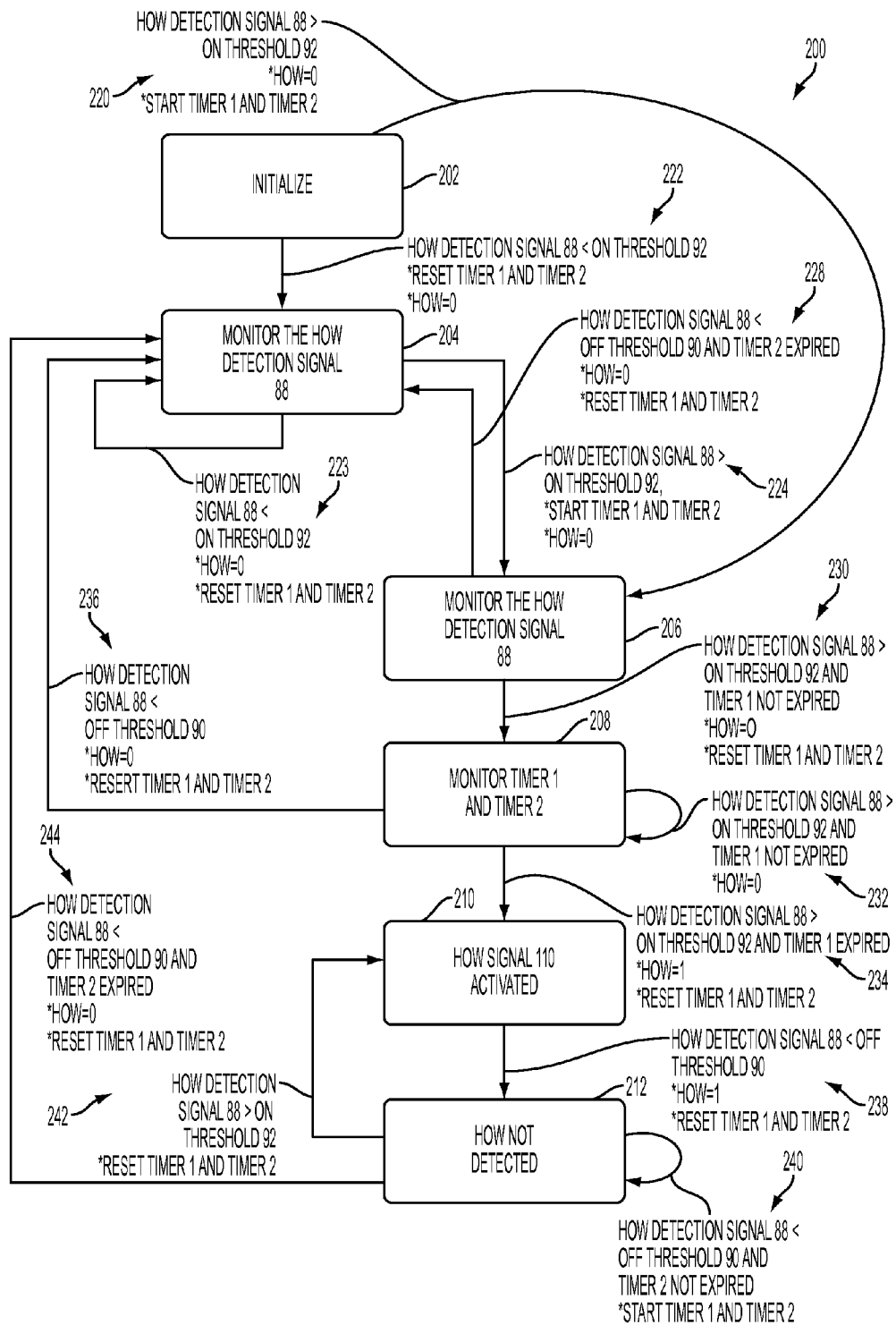
FIG. 5 is an illustration of a state diagram for the dataflow diagram shown in FIG. 3, in accordance with yet another exemplary embodiment of the invention.

FIG. 5 is a state diagram 200 illustrating one approach for activating and deactivating the HOW signal 110 by the ON/OFF sub-module 104. Referring now to both FIGS. 3 and 5, the state diagram 200 starts at block 202, where the HOW state detector 74 is initialized if the HOW detection signal 88 is received by the state detector 74. During initialization, the first timer T1 and the second timer T2 are reset (e.g., the reset signal 132 is sent), and a HOW state is set to zero (HOW=0), which indicates that the state detector 74 does not send the HOW signal 110 to the torque assist generation module 76. If the HOW state is set to zero and the state detector 74 does not send the HOW signal 110 to the torque assist generation module 76, this means that the hands off wheel condition exists. Thus, either the HOW condition exists or the hands off wheel condition exists (e.g., either HOW=1 and a hands off wheel condition=0, or HOW=0 and a hands off condition=1). If the HOW detection signal 88 is greater than the ON threshold value 92, then the HOW state detector 74 may proceed to block 206. The conditions required to proceed from block 202 to 206 are indicated by transition state 220, where the HOW detection signal 88 is greater than the ON threshold value 92. The asterisk symbol (*) as shown in FIG. 5 indicates an output condition generated by the ON/OFF module 104. Specifically, the outputs include the HOW=0 state, and the start timer signal 130 (e.g., the start timer signal 130 is sent by the ON/OFF sub-module 130 to the first timer T1 and the second timer T2).

If the HOW detection signal 88 is less than the ON threshold value 92, then the HOW state detector 74 may then proceed to block 204. The conditions required to proceed from block 202 and 204 are indicated by transition state 222, where the HOW detection signal 88 is less than the ON threshold value 92, and the outputs are HOW=0, and the first timer T1 and the second timer T2 are reset (e.g., by the reset signal 132).

In block 204 of the state diagram 200, the ON/OFF sub-module 104 continues to monitor the HOW detection signal 88. The conditions required for continuing to monitor the HOW detection signal 88 are indicated by transition state 223 (e.g., the HOW detection signal 88 is less than the ON threshold value 92, and the outputs are HOW=0 and the reset signal 132 is sent to the first timer T1 and the second timer T2). Once the HOW detection signal 88 exceeds the ON threshold value 92, the ON/OFF sub-module 104 sends the start timer signal 130 to first timer T1 and the second timer T2. The state detector 74 may then proceed to block 206, where the conditions to proceed from block 204 to 206 are indicated by transition state 224 (e.g., the HOW detection signal 88 is greater than the ON threshold value 92, and the outputs are HOW=0 and the start timer signal 130).

In block 206, the ON/OFF sub-module 104 continues to monitor the HOW detection signal 88 with the first timer T1 and the second timer T2 activated. If the HOW detection signal 88 is less than the OFF threshold value 90 after the second timer T2 expires, then the state detector 74 may reset both the first timer T1 and the second timer T2, and return to block 204. The conditions required to proceed from block 206 back to block 204 are indicated by transition state 228 (e.g., the HOW detection signal 88 is less than the OFF threshold value 90, and the outputs are HOW=0 and the reset signal 132). However, if the HOW detection signal 88 is greater than the ON threshold value 92, and if the first timer T1 has not expired, then the state detector 74 may proceed to block 208. The conditions required to proceed from block 206 to 208 are indicated by transition state 230 (e.g., the HOW detection signal 88 is greater than the ON threshold value 92, the first timer T1 is not expired, and the output is HOW=0).

In block 208, the ON/OFF sub-module 104 continues to monitor the HOW detection signal 88 until the first timer T1 expires. The conditions required for continuing to monitor the HOW detection signal 88 are indicated by transition state 232 (e.g., the HOW detection signal 88 is greater than the ON threshold value 92 and the first timer T1 has not expired, and the output is HOW=0). Once the Timer 1 expired signal 134 from the first timer T1 is sent to the ON/OFF sub-module 104, the ON/OFF sub-module 104 may then determine if the HOW detection signal 88 has remained above the ON threshold value 92 during the first interval of time after receiving the Timer 1 expired signal 134. If the HOW detection signal 88 has remained above the ON threshold value 92 during the first interval of time, then the HOW condition exists. The ON/OFF sub-module 104 may then activate the HOW signal 110 (e.g., the HOW state is set to 1), and proceed to block 210. The conditions to proceed from block 208 to 210 are indicated by transition state 234 (e.g., the HOW detection signal 88 is greater than the ON threshold value 92, the first timer T1 is expired, and the output is HOW=1 and the reset signal 132 is sent to the first timer T1 and the second timer T2).

However, if the ON/OFF sub-module 104 receives the Timer 2 expired signal 136, and if the HOW detection signal 88 has remained below the OFF threshold value 90 during the second interval of time, the ON/OFF sub-module 104 may send the reset signal 132 to the first timer T1 and the second timer T2, and return to block 204. The conditions to return from block 208 to 204 are indicated by transition state 236 (e.g., the HOW detection signal 88 is less than the OFF threshold value 90, and the output is HOW=0 and the reset signal 132 sent to the first timer T1 and the second timer T2).

In block 210, the HOW signal 110 has been activated by ON/OFF sub-module 104. The ON/OFF sub-module 104 continues to monitor the HOW detection signal 88. If the HOW detection signal 88 falls below the OFF threshold value 90, the ON/OFF sub-module 104 sends the start timer signal 130 to first timer T1 and the second timer T2. However, the HOW state is still set to 1 (e.g., HOW=1). The state detector 74 may then proceed to block 212. The conditions to proceed from block 210 to 212 are indicated by transition state 238 (e.g., the HOW detection signal 88 is less than the OFF threshold value 90, then the output is HOW=1 and the reset signal 132 is sent).

In block 212, the ON/OFF sub-module 104 continues to monitor the HOW detection signal 88. The conditions required for continuing to monitor the HOW detection signal 88 are indicated by transition state 240 (e.g., the HOW detection signal 88 is less than the OFF threshold value 90 and the second timer T2 has not expired, and the output is the start timer signal 130 being sent). Once the Timer 1 expired signal 134 is received from the first timer T1, the ON/OFF sub-module 104 determines if the HOW detection signal 88 has remained above the ON threshold value 92 during the first interval of time. If the HOW detection signal 88 has remained above the ON threshold value 92 during the first interval of time, then the HOW condition continues to exist. The HOW state detector 74 may send the reset signal 132 to the first timer T1 and the second timer T2, and return to block 210. The conditions to return from block 212 to 210 are indicated by transition state 242 (e.g., the HOW detection signal 88 is greater than the ON threshold value 92, and the reset signal 132 is sent).

If the HOW detection signal 88 does not remain above the ON threshold value 92 during the first interval of time, the state detector 74 may continue to monitor the second timer T2. Once the Timer 2 expired signal 136 from the second timer T2 is sent, if the HOW detection signal 88 has remained below the OFF threshold value 90 during the second interval of time, the ON/OFF sub-module 104 sends the reset signal 132 to the first timer T1 and the second timer T2. The HOW state is set to 0 (e.g., HOW=0) and the HOW signal 110 is no longer sent to the torque assist generation module 76. The state detector 74 may then return to block 204. The conditions to return from block 212 to 204 are indicated by transition state 244 (e.g., the HOW detection signal 88 is less than the OFF threshold value 90, the second timer T2 has expired, and the output is HOW=0 the reset signal 132 is sent).

Figure 6:
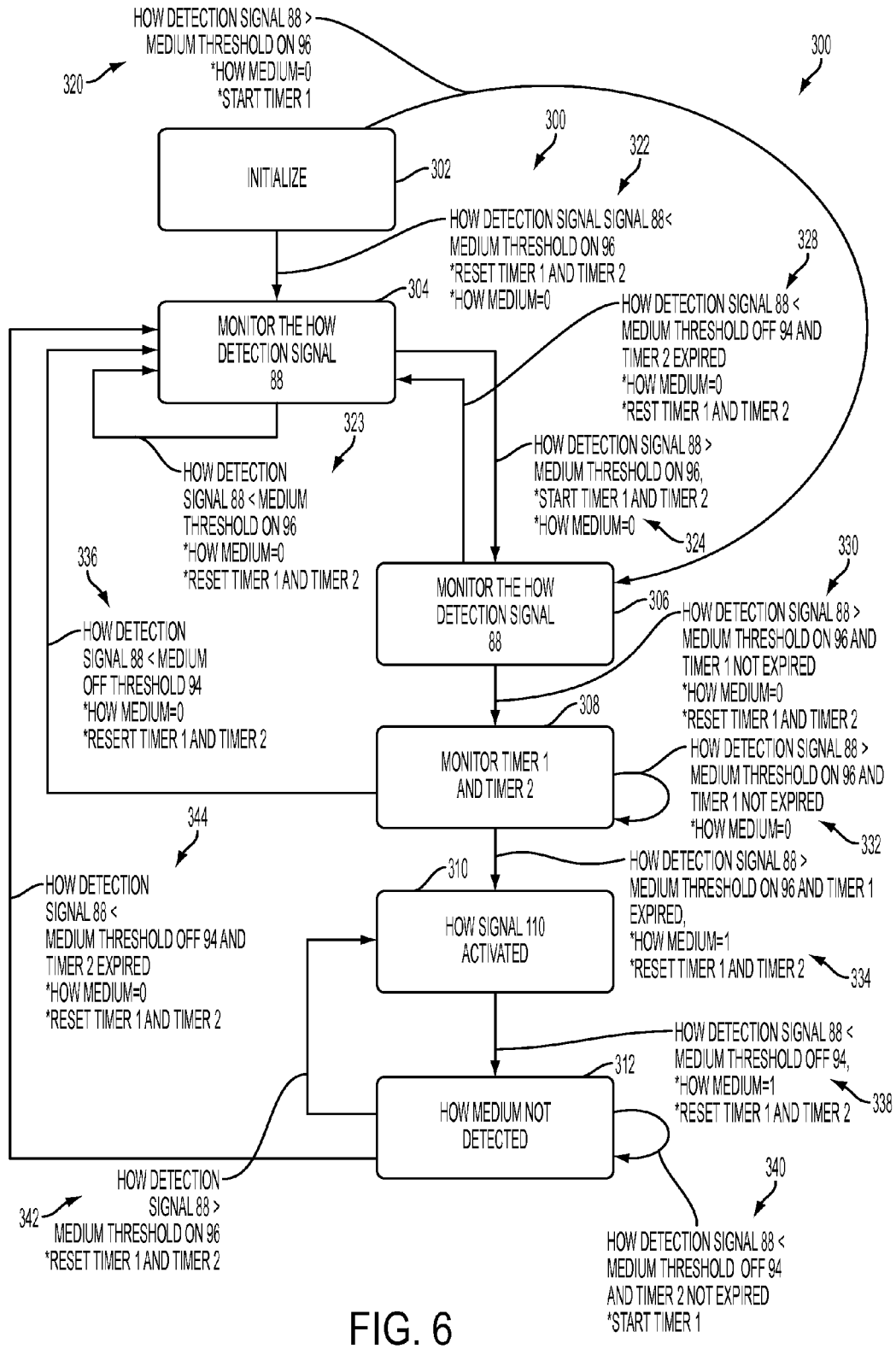
FIG. 6 is an illustration of another state diagram for the dataflow diagram shown in FIG. 3, in accordance with another exemplary embodiment of the invention.

FIG. 6 is a state diagram 300 illustrating one approach for activating and deactivating the HOW medium signal 112 by the medium sub-module 106. Referring now to both FIGS. 3 and 6, the state diagram 300 starts at block 302, where the HOW state detector 74. During initialization, the medium first timer T1 and the medium second timer T2 are reset (e.g., the reset signal 142 is sent), and a HOW Medium state is set to zero (HOW Medium=0), which indicates that the state detector 74 does not send the HOW Medium signal 112 to the torque assist generation module 76. If the HOW detection signal 88 is greater than the Medium threshold ON value 96, the HOW state detector 74 may then proceed to block 306. The conditions to proceed from block 302 to 306 are indicated by transition state 320, where the HOW detection signal 88 is greater than the Medium threshold ON value 96, and the outputs include HOW Medium=0, and the start timer signal 140 that is sent to the medium first timer T1 and the medium second timer T2.

If the HOW detection signal 88 is less than the Medium Threshold ON signal 96, then the HOW state detector 74 may proceed to block 304. The conditions required to proceed from block 302 and 304 are indicated by transition state 322, where the HOW detection signal 88 is less than the Medium threshold ON value 96, and the outputs are HOW Medium=0, and the medium first timer T1 and the medium second timer T2 are reset (e.g., by the reset signal 142).

In block 304, the medium sub-module 106 continues to monitor the HOW detection signal 88. The conditions required for continuing to monitor the HOW detection signal 88 are indicated by transition state 323 (e.g., the HOW detection signal 88 is less than the Medium threshold ON value 96, and the output is HOW Medium=0 and the reset signal 142 is sent to the medium first timer T1 and the medium second timer T2). Once the HOW detection signal 88 exceeds the Medium threshold ON value 96, the medium sub-module 106 sends the start signal 140 to first timer T1 and the second timer T2. The state detector 74 may then proceed to block 306, where the conditions to proceed from block 304 to 306 are indicated by transition state 324 (e.g., the HOW detection signal 88 is greater than the Medium Threshold ON 96, and the outputs are HOW Medium=0 and the start timer signal 140).

In block 306, the medium sub-module 106 continues to monitor the HOW detection signal 88 with the first timer T1 and the second timer T2 activated. If the HOW detection signal 88 is less than the Medium Threshold OFF value 94 after the medium second timer T2 expires, then the state detector 74 may reset both the medium first timer T1 and the medium second timer T2, and return to block 304. The conditions required to proceed from block 306 back to block 304 are indicated by transition state 328 (e.g., HOW detection signal 88 is less than the Medium Threshold OFF value 94, and the outputs are HOW Medium=0 and the reset signal 142). However, if the HOW detection signal 88 is greater than the Medium threshold ON value 96, and if the medium first timer T1 has not expired, then the state detector 74 may proceed to block 308. The conditions to proceed from block 306 to 308 are indicated by transition state 330 (e.g., the HOW detection signal 88 is greater than the Medium threshold ON value 96, the medium first timer T1 is not expired, and the output is HOW Medium=0).

In block 308, the medium sub-module 106 continues to monitor the HOW detection signal 88 until the first timer T1 expires. The conditions required for continuing to monitor the HOW detection signal 88 are indicated by transition state 332 (e.g., the HOW detection signal 88 is greater than the Medium Threshold ON value 96 and the medium first timer T1 has not expired, and the output is HOW Medium=0). Once the Timer 1 expired signal 134 from the first timer T1 is sent to the medium sub-module 106, the medium sub-module 106 may then determine if the HOW detection signal 88 has remained above the Medium Threshold ON value 96 during the first interval of time after receiving the medium Timer 1 expired signal 144. If the HOW detection signal 88 has remained above the Medium Threshold ON value 96 during the first interval of time, then the Medium HOW condition exists. The medium sub-module 106 may then activate the HOW Medium signal 112 (e.g., the HOW medium state is set to 1), and proceed to block 310. The conditions to proceed from block 308 to 310 are indicated by transition state 334 (e.g., the HOW detection signal 88 is greater than the Medium Threshold ON value 96, the medium first timer T1 is expired, and the output is HOW Medium=1 and the reset signal 142 sent to the medium first timer T1 and the medium second timer T2).

However, if the state detector 74 receives the Timer 2 expired signal 136, and if the HOW detection signal 88 has remained below the Medium threshold OFF value 94 during the second interval of time, the medium sub-module 106 may send the reset signal 142 to the first timer T1 and the second timer T2, and return to block 304. The conditions to return from block 308 to 304 are indicated by transition state 336 (e.g., the HOW detection signal 88 is less than the Medium Threshold OFF value 94, and the output is HOW Medium=0 and the reset signal 142 sent to the medium first timer T1 and the medium second timer T2).

In block 310, the HOW Medium signal 110 has been activated by the medium sub-module 106. The state detector 74 continues to monitor the HOW detection signal 88. If the HOW detection signal 88 falls below the Medium threshold OFF value 94, the medium sub-module 106 sends the start signal 140 to first timer T1 and the second timer T2. However, the HOW state is still set to 1 (e.g., HOW Medium=1). The state detector 74 may then proceed to block 312. The conditions to proceed from block 310 to 312 are indicated by transition state 338 (e.g., the HOW detection signal 88 is less than the Medium Threshold OFF 94, then the output is HOW Medium=1 and the reset signal 142 is sent).

In block 312, the medium sub-module 106 continues to monitor the HOW detection signal 88. The conditions required for continuing to monitor the HOW detection signal 88 are indicated by transition state 340 (e.g., the HOW detection signal 88 is less than the Medium Threshold OFF value 94 and the medium second timer T2 has not expired, and the output is the start timer signal 140 being sent). Once the Timer 1 expired signal 134 is received from the first timer T1, the medium sub-module 106 determines if the HOW detection signal 88 has remained above the Medium threshold ON value 96 during the first interval of time. If the HOW detection signal 88 has remained above the Medium threshold ON value 96 during the first interval of time, then the Medium HOW condition continues to exist. The HOW state detector 74 may send the reset signal 142 to the medium first timer T1 and the medium second timer T2, and return to block 310. The conditions to return from block 312 to 310 are indicated by transition state 342 (e.g., the HOW detection signal 88 is greater than the Medium Threshold ON value 96, and the reset signal 142 is sent).

If the HOW detection signal 88 does not remain above the Medium Threshold ON value 96 during the first interval of time, the state detector 74 may continue to monitor the medium second timer T2. Once the Timer 2 expired signal 136 from the medium second timer T2, if the HOW detection signal 88 has remained below the Medium threshold OFF value 94 during the second interval of time, the state detector 74 sends the reset signal 132 to the first timer T1 and the second timer T2. The HOW state is set to zero (e.g., HOW Medium=0) and the HOW signal 112 is no longer sent to the torque assist generation module 76. The state detector 74 may then return to block 304. The conditions to return from block 312 to 304 are indicated by transition state 344 (e.g., the HOW detection signal 88 is less than the Medium Threshold OFF value 94, the medium second timer T2 has expired, and the output is HOW Medium=0 the reset signal 142 is sent).

Figure 7:
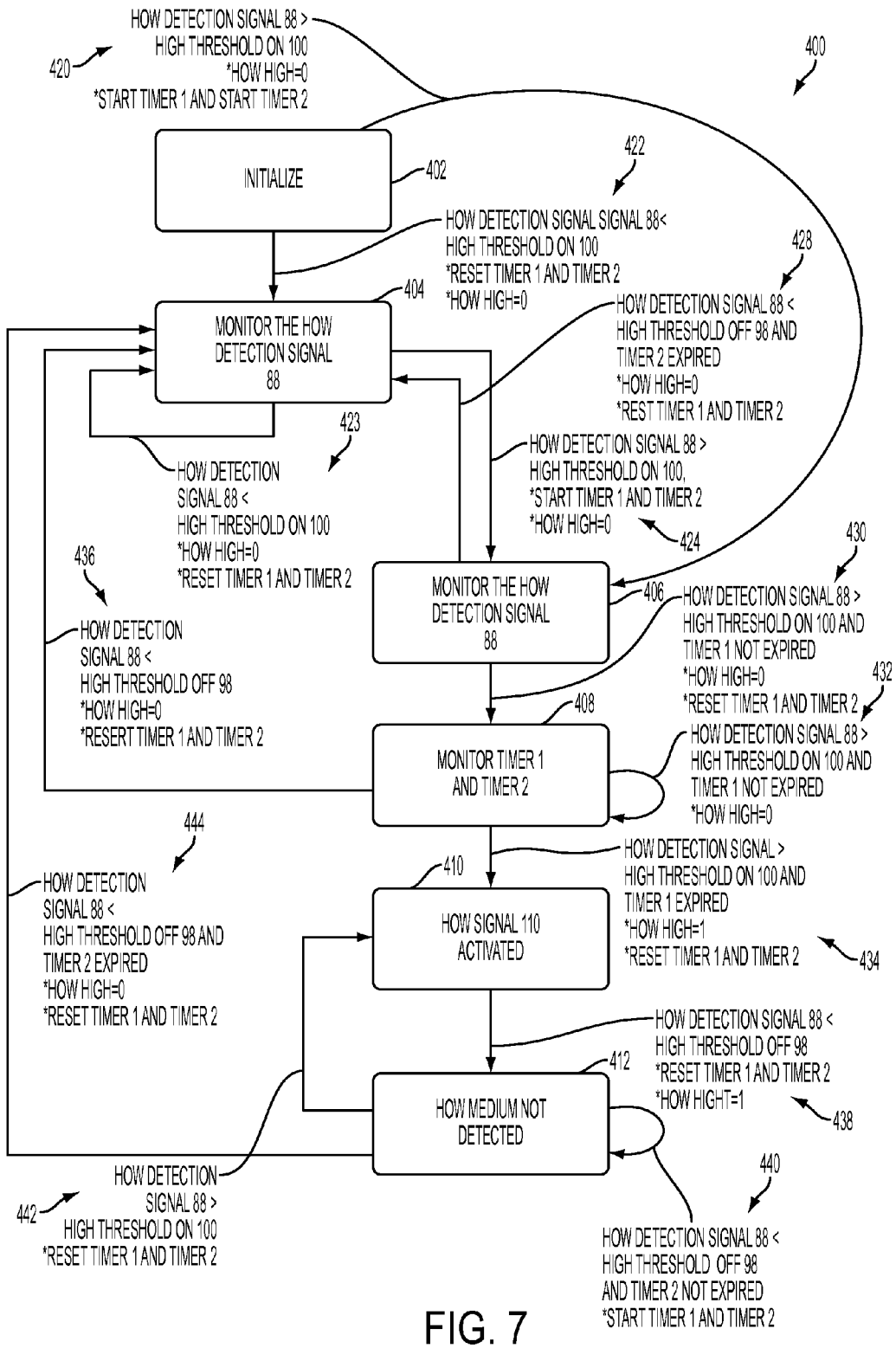
FIG. 7 is an illustration of yet another a state diagram for the dataflow diagram shown in FIG. 3, in accordance with yet another exemplary embodiment of the invention.

FIG. 7 is a state diagram 400 illustrating one approach for activating and deactivating the HOW High signal 114 by the high sub-module 108. Referring now to both FIGS. 3 and 7, the state diagram 400 starts at block 402, where the HOW state detector 74 is initialized if the HOW detection signal 88 is received by the state detector 74. During initialization, the high first timer T1 and the high second timer T2 are reset (e.g., the reset signal 152 is sent), and a HOW state is set to zero (e.g., HOW High=0), which indicates the state detector 74 does not send the HOW high signal 114 to the torque assist generation module 76. If the HOW detection signal 88 is greater than the High threshold ON value 100, the HOW state detector 74 may then proceed to block 406. The conditions to proceed from block 402 to 406 are indicated by transition state 420, where the HOW detection signal 88 is greater than the High threshold ON value 100, and the outputs include HOW High=0, and the start timer signal 150 that is sent to the high first timer T1 and the high second timer T2.

If the HOW detection signal 88 is less than the High threshold ON value 100, then the state detector 74 may proceed to block 404. The conditions required to proceed from block 402 and 404 are indicated by transition state 422, where the HOW detection signal 88 is less than the High Threshold ON value 100, and the outputs are HOW High=0, and the high first timer T1 and the high second timer T2 are reset (e.g., by the reset signal 152).

In block 404, the high sub-module 108 continues to monitor the HOW detection signal 88. The conditions required for continuing to monitor the HOW detection signal 88 are indicated by transition state 423 (e.g., the HOW detection signal 88 is less than the High Threshold ON value 100, and the output is HOW High=0 and the reset signal 152 is sent to the high first timer T1 and the high second timer T2). Once the HOW detection signal 88 exceeds the High threshold ON value 100, the high sub-module 108 sends the start signal 150 to the high first timer T1 and the high second timer T2. The state detector 74 may then proceed to block 406, where the conditions to proceed from block 404 to 406 are indicated by transition state 424 (e.g., the HOW detection signal 88 is greater than the High Threshold ON value 100, and the outputs are HOW High=0 and the start timer signal 150).

In block 406, the high sub-module 108 continues to monitor the HOW detection signal 88 with the first timer T1 and the second timer T2 activated. If the HOW detection signal 88 is less than the High Threshold OFF value 98 after the high second timer T2 expires, then the state detector 74 may reset both the high first timer T1 and the high second timer T2, and return to block 404. The conditions required to proceed from block 406 back to block 404 are indicated by transition state 428 (e.g., HOW detection signal 88 is less than the High Threshold OFF value 98, and the high second timer T2 has expired, then the outputs are HOW High=0 and the reset signal 152). However, if the HOW detection signal 88 is greater than the High threshold ON value 100, and if the high first timer T1 has not expired, then the state detector 74 may proceed to block 408, where the conditions to proceed from block 406 to 408 are indicated by transition state 430 (e.g., the HOW detection signal 88 is greater than the High Threshold ON value 100, and first timer T1 is not expired, then the output is HOW High=0).

In block 408, the high sub-module 108 continues to monitor the HOW detection signal 88 until the high first timer T1 expires. The conditions required for continuing to monitor the HOW detection signal 88 are indicated by transition state 432 (e.g., the HOW detection signal 88 is greater than the High Threshold ON value 100 and the high first timer T1 has not expired, and the output is HOW High=0). Once the Timer 1 expired signal 134 from the first timer T1 is sent to the high sub-module 108, the high sub-module 108 may then determine if the HOW detection signal 88 has remained above the High Threshold ON value 100 during the first interval of time after receiving the Timer 1 expired signal 154. If the HOW detection signal 88 has remained above the High Threshold ON value 100 during the first interval of time, then a High HOW condition exists (e.g., the HOW high state is set to 1). The high sub-module 108 may then activate the HOW High signal 112, and proceed to block 410. The conditions to proceed from block 408 to 410 are indicated by transition state 434 (e.g., the HOW detection signal 88 is greater than the High Threshold ON value 100, the high first timer T1 is expired, and the output is HOW High=1 and the reset signal 152 sent to the high first timer T1 and the high second timer T2).

However, if the high sub-module 108 receives the Timer 2 expired signal 136, and if the HOW detection signal 88 has remained below the High threshold OFF value 98 during the second interval of time, the high sub-module 108 may send the reset signal 152 to the first timer T1 and the second timer T2, and return to block 404. The conditions to return from block 408 to 404 are indicated by transition state 436 (e.g., the HOW detection signal 88 is less than the High Threshold OFF value 98, and the output is HOW High=0 and the reset signal 152 sent to the high first timer T1 and the high second timer T2).

In block 410, the HOW High signal 112 has been activated by the high sub-module 108. The high sub-module 108 continues to monitor the HOW detection signal 88. If the HOW detection signal 88 falls below the High threshold OFF value 98, the high sub-module 108 sends the start signal 150 to first timer T1 and the second timer T2. However, the HOW state is still set to 1 (e.g., HOW high=1). The state detector 74 may then proceed to block 412. The conditions to proceed from block 410 to 412 are indicated by transition state 438 (e.g., the HOW detection signal 88 is less than the High Threshold OFF value 98, then output is HOW High=1 and the reset signal 152 is sent).

In block 412, the high sub-module 108 continues to monitor the HOW detection signal 88. The conditions required for continuing to monitor the HOW detection signal 88 are indicated by transition state 440 (e.g., the HOW detection signal 88 is less than the High Threshold OFF value 98 and the high second timer T2 has not expired, and the output is the start timer signal 150 being sent). Once the Timer 1 expired signal 134 is received from the high first timer T1, the high sub-module 108 determines if the HOW detection signal 88 has remained above the High threshold ON value 100 during the first interval of time. If the HOW detection signal 88 has remained above the High threshold ON value 100 during the first interval of time, then the HOW high condition continues to exist. The HOW state detector 74 may send the reset signal 152 to the high first timer T1 and high second timer T2, and return to block 410. The conditions to return from block 412 to 410 are indicated by transition state 442 (e.g., the HOW detection signal 88 is greater than the High Threshold ON value 100, and the reset signal 152 is sent).

If the HOW detection signal 88 does not remain above the High Threshold ON value 100 during the first interval of time, the state detector 74 may continue to monitor the high second timer T2. Once the Timer 2 expired signal 136 from the high second timer T2 is received, if the HOW detection signal 88 has remained below the High threshold OFF value 98 during the second interval of time, the state detector 74 sends the reset signal 132 to the first timer T1 and the second timer T2. The HOW state is set to 0 (e.g., HOW high=0) and the HOW high signal 114 is no longer sent to the torque assist generation module 76. The state detector 74 may then return to block 404. The conditions to return from block 412 to 404 are indicated by transition state 444 (e.g., the HOW detection signal 88 is less than the High Threshold OFF value 98, the high second timer T2 has expired, and the output is HOW High=0, and the reset signal 152 is sent).

Figure 8:
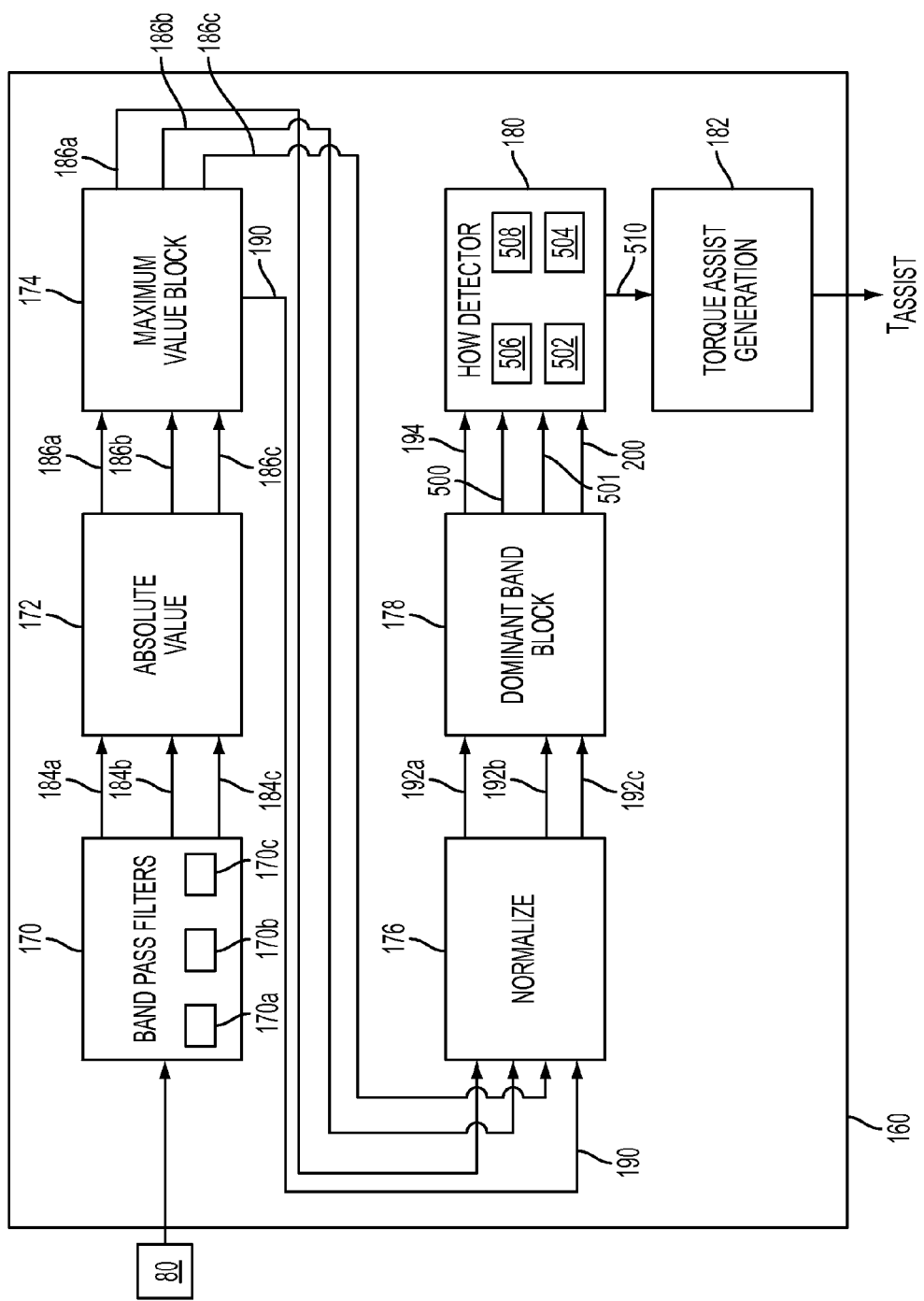
FIG. 8 is an illustration of a dataflow diagram for the control module shown in FIG. 2, in accordance with another exemplary embodiment of the invention.

FIG. 8 illustrates an alternative embodiment for determining the HOW condition. In the embodiment as shown, a control module 160 includes a bandpass filter block 170, an absolute value calculation block 172, a maximum value block 174, a normalize block 176, a dominant frequency band block 178, a HOW detector module 180, and a torque assist generation module 182.

The control module 160 receives as input the torque signal 80 from the torque sensor 50 (FIG. 2) indicative of the amount of torque exerted on the hand wheel 34 (FIG. 2). The torque signal 80 is a time domain based signal having a sequence of data points measured at successive time intervals. The bandpass filter block 170 receives as input the torque signal 80. In the exemplary embodiment as discussed, three bandpass filters 170a, 170b, and 170c are provided in the bandpass filter block 170. However, it is to be understood that at least two bandpass filters are required, and any number of bandpass filters may be used depending on the application.

Each bandpass filter 170a, 170b, and 170c has a different passband value or range that falls within the normal column mode frequency. For example, if the normal column mode frequency ranges from about 8 Hertz to about 15 Hertz, the bandpass filter 170a may have a passband that ranges from about 8 to about 10 Hertz, bandpass filter 170b may have a passband that ranges from about 10 to about 12 Hertz, and bandpass filter 170c may have a passband that ranges from about 13 to about 15 Hertz. However, it is to be noted that other passband ranges may be used as well (e.g., 1 Hertz).

Figure 9:
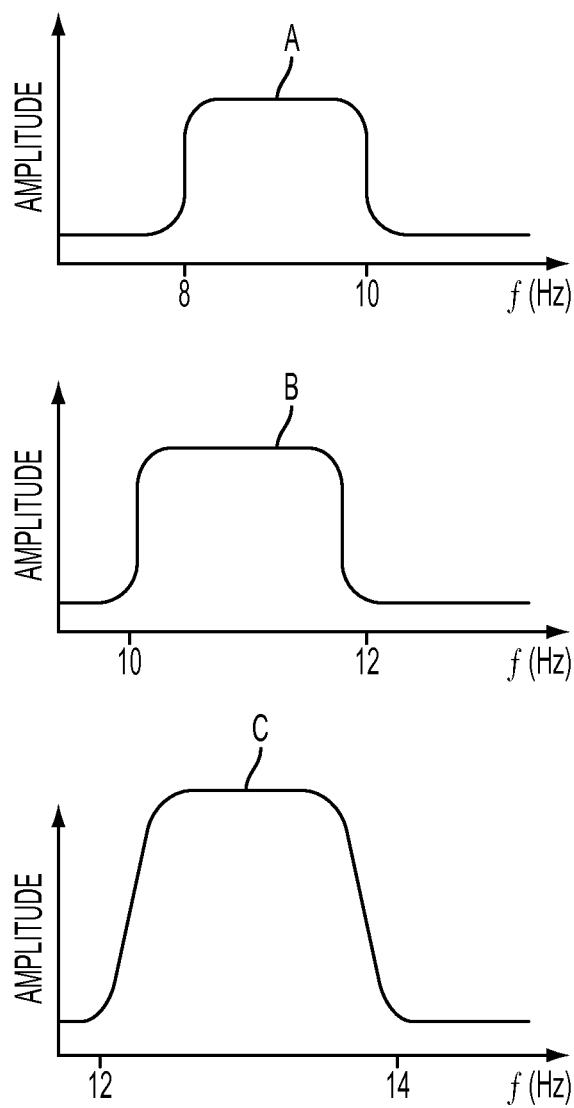
FIG. 9 is an illustration of various passbands generated by the control module shown in FIG. 8, in accordance with another exemplary embodiment of the invention.

Referring to FIGS. 8-9, the bandpass filter 170a produces a passband A (shown in FIG. 9), the bandpass filter 170b produces a passband B (shown in FIG. 9), and the bandpass filter 170c produces a passband C (shown in FIG. 9). As seen in FIG. 9, the passband C has an amplitude that greater than the amplitude of passband A and passband B. The bandpass filter 170a produces a frequency band signal 184a that is representative of passband A, the bandpass filter 170b produces a frequency band signal 184b that is representative of passband B, and the bandpass filter 170c produces a frequency band signal 184c that is representative of passband C, where the peak gain in the passbands are adjusted to be at about 0 dB.

The absolute value calculation block 172 receives as input the frequency band signals 184a, 184b, and 184c. The absolute value calculation block 172 determines an absolute value of the amplitude of the frequency band signal 184a (passband A), frequency band signal 184b (passband B), and frequency band signal 184c (passband C). The absolute value calculation block 172 generates as output absolute value signals 186a, 186b, and 186c. The absolute value signal 186a is the absolute value of the passband A, the absolute value signal 186b is the absolute value of the passband B, and absolute value signal 186c is the absolute value of the passband C.

The maximum value block 174 receives as input the absolute value signals 186a, 186b, 186c. The maximum value block 174 compares and selects a maximum value of the absolute value signals 186a, 186b, and 186c, and sets the maximum value as a detector value 190. For example, if the normalize block 176 receives as input an absolute value 186a (which represents the passband A), absolute value 186b (which represents passband B) and absolute value 186c (which represents passband C), the maximum value block 174 would determine the detector value 190 is the absolute value 184c.

The normalize block 176 receives as input the detector value 190 as well as the absolute value signals 186a, 186b, and 186c from the maximum value block 174. The normalize block 176 divides each of the absolute value signals 186a, 186b, and 186c by the detector value 190 and to determine a normalized value 192a, a normalized value 192b, and a normalized value 192c.

The dominant band block 178 receives as input the normalized values 192a, 192b, and 192c from the normalize block 176. The dominant band block 178 selects the greatest or maximum value of the normalized values 192a, 192b, and 192c (e.g., which represents the dominant frequency from the bandpass filters 170a-170c). The greatest value is set by the dominant band block 178 as a dominant frequency 194. For example, if the dominant band block 178 receives as input the normalized value 192a (which is representative of passband A), normalized value 192b (which is representative of passband B) and normalized value 192c (which is representative of passband C), the dominant frequency 194 would be representative of passband C. Because the normalized values 192a, 192b, and 192c are based on the detector signal 190 as well as the absolute value of the passbands, the dominant frequency 194 is based on a value that is a mix of multiple passbands (e.g., passband A, passband B, and passband C). In other words, the dominant frequency 194 is based on a combination of passbands.

In one exemplary embodiment, the dominant band block 178 may select a second dominant frequency 200 based on the normalized values 192a, 192b, and 192c in addition to the dominant band value 194. The second dominant frequency 200 is the second greatest value of the normalized values 192a, 192b, and 192c. The second dominant frequency 200 may be used in conjunction with the dominant frequency 194 to determine mode shapes of the hand wheel 34 and the steering shaft 36 (FIG. 2). Specifically, a HOW OFF mode shape 500 indicates operation in normal column mode (e.g., the hands off wheel condition) and a HOW ON mode shape 501 indicates operation during the HOW condition.

The HOW detector module 180 receives as input the dominant frequency 194, the second dominant frequency 200, the HOW OFF mode shape 500 and the HOW On mode shape 501. The HOW detector module 180 stores in memory a hands on frequency range 502 that represents the frequency of the hand wheel 34 and the steering shaft 36 (FIG. 2) during the HOW condition (a driver has his or her hands on the hand wheel 34). The HOW detector module 180 compares the dominant frequency 194 with the hands on frequency range 502, and if the dominant frequency 194 falls within the hands on frequency range 502 this is an indication the HOW condition exists. If the HOW condition exists, the HOW detector module 180 outputs a HOW signal 510.

Alternatively or in addition to the hands on frequency range 502, the HOW detector module 180 may also store in memory a hands off frequency range 504 that represents the frequency of the hand wheel 34 and the steering shaft 36 (FIG. 2) if a driver does not have his or her hands on the hand wheel 34. The HOW detector module 180 compares the dominant frequency 194 with the hands off frequency range 504, and if the dominant frequency 194 falls within the hands off frequency range 504, this is an indication that the HOW condition does not exist, and that a driver does not have his or her hands on the hand wheel 34 (FIG. 2).

In one embodiment, the HOW detector module 180 may store a HOW OFF mode shape value 506 and a HOW ON mode shape value 508 of the hand wheel 34 and the steering shaft 36 (FIG. 2), where the HOW OFF mode shape value 506 represents the mode shape in normal column mode (e.g., a hands off mode) and the HOW ON mode shape value 508 represents the mode shape in hands on mode. The HOW OFF mode shape 500 (determined in the dominant band block 178) may be compared to the HOW OFF mode shape value 506 to determine a hands off condition. Alternatively, or in addition to the hands off determination, the HOW ON mode shape 501 may be compared to the HOW ON mode shape value 508 to determine that the HOW condition exists. If the HOW detector module 180 determines HOW condition exists based on the HOW ON mode shape 501, the HOW detector module 180 outputs the HOW signal 510.

The torque assist generation module 182 receives as input the HOW signal 510 from the HOW detector module 180. The torque assist generation module 182 selectively generates the torque assist command $T_{assist}$ upon the hand wheel 34 (FIG. 2) based on the input from the torque assist generation module

182. Specifically, the torque assist generation module 182 may not generate the torque assist command $T_{assist}$ unless the HOW signal 510 is received.

Referring generally to FIGS. 1-9, the lane monitoring system 32 (FIG. 2) provides assistance to a driver to maneuver the vehicle 10 by providing either the assist mode or autonomous mode. In assist mode, the lane monitoring system 32 may not apply torque nudges to the hand wheel 34 (e.g., by the torque assist command $T_{assist}$) unless the HOW condition is detected (e.g., a driver has his or her hands on the hand wheel 34). Also, some jurisdictions do not allow the lane monitoring system to switch from assist mode into autonomous mode unless the HOW condition is detected as well. The embodiments as discussed above in FIGS. 1-9 provide a relatively simple and cost-effective approach to determine the HOW condition. Specifically, the embodiments as discussed above do not generally require additional sensors or hardware (e.g., capacitive touch sensors) to determine the HOW condition. Additional sensors or hardware generally add additional costs to the steering system 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system to determine a hands on wheel (HOW) condition of a hand wheel, the control system comprising:
a sensor that monitors an amount of applied torque exerted upon the hand wheel; and
a control module for monitoring the sensor, the control module including:
a notch filter to attenuate a normal column mode frequency from the amount of applied torque to produce a filtered torque signal, the normal column mode frequency configured to represent a range of vibrational modes of the hand wheel based on a hands off wheel condition; and
a state detector to receive the filtered torque signal from the notch filter, the state detector configured to determine if the HOW condition exists based on if the filtered torque signal exceeds an ON threshold torque value.

2. The control system as recited in claim 1, wherein the control module includes a torque assist generation module, wherein the state detector is configured to send a HOW input to the torque assist generation module if the HOW condition exists.

3. The control system as recited in claim 2, wherein the torque assist generation module is configured to generate a torque assist command if the HOW input is received from the state detector.

4. The control system as recited in claim 2, wherein the control module is part of a lane monitoring system, and wherein the torque assist command is configured to create at least one torque nudge in the hand wheel if the lane monitoring system is in an assist mode.

5. The control system as recited in claim 1, wherein the control module is part of a lane monitoring system, and wherein the lane monitoring system switches from an assist mode to an autonomous mode based on the HOW condition existing.

6. The control system as recited in claim 1, wherein the state detector determines the HOW condition exists if the filtered torque value exceeds the ON threshold torque value during a predetermined time interval.

7. The control system as recited in claim 1, wherein the state detector determines a level of force exerted on the hand wheel based on comparing the filtered torque signal to one of a HOW medium threshold torque value and a HOW high threshold torque value, the HOW medium threshold value being less than the HOW high threshold value and greater than the HOW ON threshold torque value.

8. The control system as recited in claim 1, wherein the state detector determines the hands off wheel condition exists if the filtered torque signal remains below an OFF threshold torque value for a second predetermined time interval.

9. The control system as recited in claim 1, wherein the ON threshold torque value is adjusted based on a vehicle speed value.

10. A method of determining a hands on wheel (HOW) condition of a hand wheel, the method comprising:
monitoring a sensor for an amount of applied torque exerted upon the hand wheel by a control module;
attenuating a normal column mode frequency from the amount of applied torque to produce a filtered torque signal by a notch filter of the control module, the normal column mode frequency configured to represent a range of vibrational modes of the hand wheel based on a hands off wheel condition;
receiving the filtered torque signal by a state detector of the control module; and
determining if the HOW condition exists by the state detector, the determining based on comparing the filtered torque signal with an ON threshold torque value.

11. The method as recited in claim 10, comprising including a torque assist generation module that receives a HOW input from the state detector if the HOW condition exists.

12. The method as recited in claim 11, comprising generating a torque assist command by the torque assist generation module if the HOW input is received from the state detector.

13. The method as recited in claim 12, wherein the control module is part of a lane monitoring system, and wherein the lane monitoring system switches from an assist mode to an autonomous mode based on the HOW condition existing.

14. The method as recited in claim 10, wherein the control module is part of a lane monitoring system, and wherein the lane monitoring system does not switch from an assist mode to an autonomous mode unless the HOW condition exists.

15. The method as recited in claim 10, comprising determining the HOW condition exists if the filtered torque value exceeds the ON threshold torque value during a predetermined time interval.

16. The method as recited in claim 10, comprising determining a level of force exerted on the hand wheel based on comparing the filtered torque signal to one of a HOW medium threshold torque value and a HOW high threshold torque value, the HOW medium threshold value being less than the HOW high threshold value and greater than the HOW ON threshold torque value.

17. The method as recited in claim 10, comprising determining the hands off wheel condition exists if the filtered torque signal remains below an OFF threshold torque value for a second predetermined time interval.

18. A control system to determine a hands on wheel (HOW) condition of a hand wheel, the control system comprising:

a sensor that monitors an amount of applied torque exerted upon the hand wheel; and a control module for monitoring the sensor, the control module including:

a bandpass filter module to receive the amount of applied torque and producing at least two passbands based on the amount of applied torque, the at least two passbands falling within the normal column mode frequency, the normal column mode frequency representing a range of vibrational modes of the hand wheel based on a hands off wheel condition;

a dominant band block configured to determine a dominant frequency based on the at least two passbands; and a HOW detector module to compare the dominant frequency to a representative frequency for determining if the HOW condition exists, the representative frequency being a range of frequencies of the hand wheel if the HOW condition exists.

19. The control system as recited in claim 18, wherein the HOW detector module is configured to compare the dominant frequency to a second representative frequency to determine if the hands off wheel condition exists, the second representative frequency being a second range of frequencies of the hand wheel if the hands off wheel condition exists.

20. The control system as recited in claim 18, wherein the dominant band block determines a second dominant frequency based on the at least two passbands, and wherein the dominant frequency and the second dominant frequency are confined to determine at least one mode shape of the hand wheel.

* * * * *